(12) United States Patent
Li et al.

(10) Patent No.: US 7,590,626 B2
(45) Date of Patent: Sep. 15, 2009

(54) DISTRIBUTIONAL SIMILARITY-BASED MODELS FOR QUERY CORRECTION

(75) Inventors: Mu Li, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/589,557

(22) Filed: Oct. 30, 2006

(65) Prior Publication Data
US 2008/0104056 A1  May 1, 2008

(51) Int. Cl.
*G06F 17/30* (2006.01)
(52) U.S. Cl. .................. 707/3; 707/4; 707/5; 704/9; 704/238; 704/258; 704/275; 705/10; 706/52; 717/205; 717/257
(58) Field of Classification Search ............ 707/3, 707/4, 5; 704/9, 238, 258, 275; 705/10; 706/52; 715/205, 257
See application file for complete search history.

(56) References Cited

U.S. PATENT DOCUMENTS

| | | | |
|---|---|---|---|
| 6,192,343 B1 * | 2/2001 | Morgan et al. | 704/275 |
| 6,424,983 B1 | 7/2002 | Shabes et al. | 707/553 |
| 6,601,059 B1 | 7/2003 | Fries | 707/3 |
| 6,711,624 B1 * | 3/2004 | Narurkar et al. | 719/321 |
| 6,772,150 B1 | 8/2004 | Whitman et al. | 707/6 |
| 6,895,993 B2 | 5/2005 | Kobayashi et al. | 137/454.6 |
| 6,937,994 B1 * | 8/2005 | Iyengar | 705/10 |
| 7,047,493 B1 | 5/2006 | Brill et al. | 715/533 |
| 7,051,023 B2 | 5/2006 | Kapur et al. | 707/5 |
| 7,152,061 B2 * | 12/2006 | Curtis et al. | 707/3 |
| 7,194,684 B1 * | 3/2007 | Shazeer | 715/205 |
| 7,321,892 B2 * | 1/2008 | Vadon et al. | 707/4 |
| 2002/0042711 A1 * | 4/2002 | Lin | 704/257 |
| 2003/0009324 A1 * | 1/2003 | Alpha | 704/9 |
| 2004/0254920 A1 | 12/2004 | Brill et al. | 707/3 |
| 2005/0131872 A1 | 6/2005 | Calbucci et al. | 707/3 |
| 2005/0210383 A1 * | 9/2005 | Cucerzan et al. | 715/533 |
| 2007/0150279 A1 * | 6/2007 | Gandhi et al. | 704/258 |

OTHER PUBLICATIONS

J.N. Darroch and D. Ratcliff, 1972, "Generalized Iterative Scaling for Long-Linear Mdoels," Annals of Mathematical Statistics, 43:1470-1480.

Ute Essen and Volker Steinbiss, 1992, "Co-Occurrence Smoothing for Stochastic Language Modeling," Proceedings of ICASSP, vol. 1, pp. 161-164.

(Continued)

*Primary Examiner*—Shahid A Alam
*Assistant Examiner*—Phong Nguyen
(74) *Attorney, Agent, or Firm*—Theodore M. Magee; Westman, Champlin & Kelly, P.A.

(57) ABSTRACT

A distributional similarity between a word of a search query and a term of a candidate word sequences is used to determine an error model probability that describes the probability of the search query given the candidate word sequence. The error model probability is used to determine a probability of the candidate word sequence given the search query. The probability of the candidate word sequence given the search query is used to select a candidate word sequence as a corrected word sequence for the search query. Distributional similarity is also used to build features that are applied in maximum entropy model to compute the probability of the candidate word sequence given the search query.

9 Claims, 8 Drawing Sheets

OTHER PUBLICATIONS

Lawrence Philips, 1990, "Hanging on the Metaphone," Computer Language Magazine, 7(12): 39.

Silviu Cucerzan et al., "Spelling Correction As An Iterative Process that Exploits the Collective Knowledge of Web Users," Proc. of EMNLP '04, pp. 293-300, 2004.

http://www.teragram.com/oem/euro_lang.htm#spelling.

Adam L. Beger et al., "A Maximum Entropy Approach to Natural Language Processing," Computational Linguistics, 22(1):39-72, 1996.

Eric Brill et al., 2000, "An Improved Error Model for Noisy Channel Spelling Correction," Proceedings of $38^{th}$ Annual Meeting of the ACL, pp. 286-293.

Ido Dagan et al., 1997, "Similarity-Based Methods for Word Sense Disambiguation," Proceedings of the $35^{th}$ Annual Meeting of ACL, pp. 56-63.

Franz Och et al., 2002, "Discriminative Training and Maimum Entropy Models for Statistical Machine Translation," Proceedings of the $40^{th}$ Annual Meeting of ACL, pp. 295-302.

* cited by examiner

DISTRIBUTIONAL SIMILARITY-BASED MODELS FOR QUERY CORRECTION

BACKGROUND

Search engines have been developed that allow users to search for documents on a network such as the Internet by submitting a search query consisting of one or more search terms. One obstacle to obtaining the proper search results is that users often misspell the terms in their query. To alleviate this problem, many search engines perform spell checking on the query and provide suggestions to the user for correcting their search query.

Some systems that perform this spelling correction rely on a source channel model. The source channel model attempts to find a candidate alternative query that has the maximum probability given the input query. This probability is determined by determining two separate probabilities: the conditional probability of the input query given the candidate; and the probability of the candidate. The probability of the candidate is typically determined using a statistical language model that provides the probability that a search query will contain the sequence of words found in the candidate. The conditional probability of the input query given the candidate is determined using an edit distance between the input query and the candidate query.

The discussion above is merely provided for general background information and is not intended to be used as an aid in determining the scope of the claimed subject matter.

SUMMARY

A distributional similarity measure between a word of a search query and a term of a candidate word sequences is used to determine an error model probability that describes the probability of the search query given the candidate word sequence. The error model probability is used to determine a probability of the candidate word sequence given the search query. The probability of the candidate word sequence given the search query is used to select a candidate word sequence as a corrected word sequence for the search query. Distributional similarity is also used to build features that are applied in a maximum entropy model to compute the probability of the candidate word sequence given the search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Under the embodiments described below, candidate query corrections for an input query can be improved by determining a distributional similarity between words of the candidate and words of the input query. These distributional similarities are applied to a source channel model or a maximum entropy model to identify the candidate that provides the highest probability. In many embodiments, the correction candidate with the highest probability will include a correction to the spelling of at least one query term.

Figure 1:
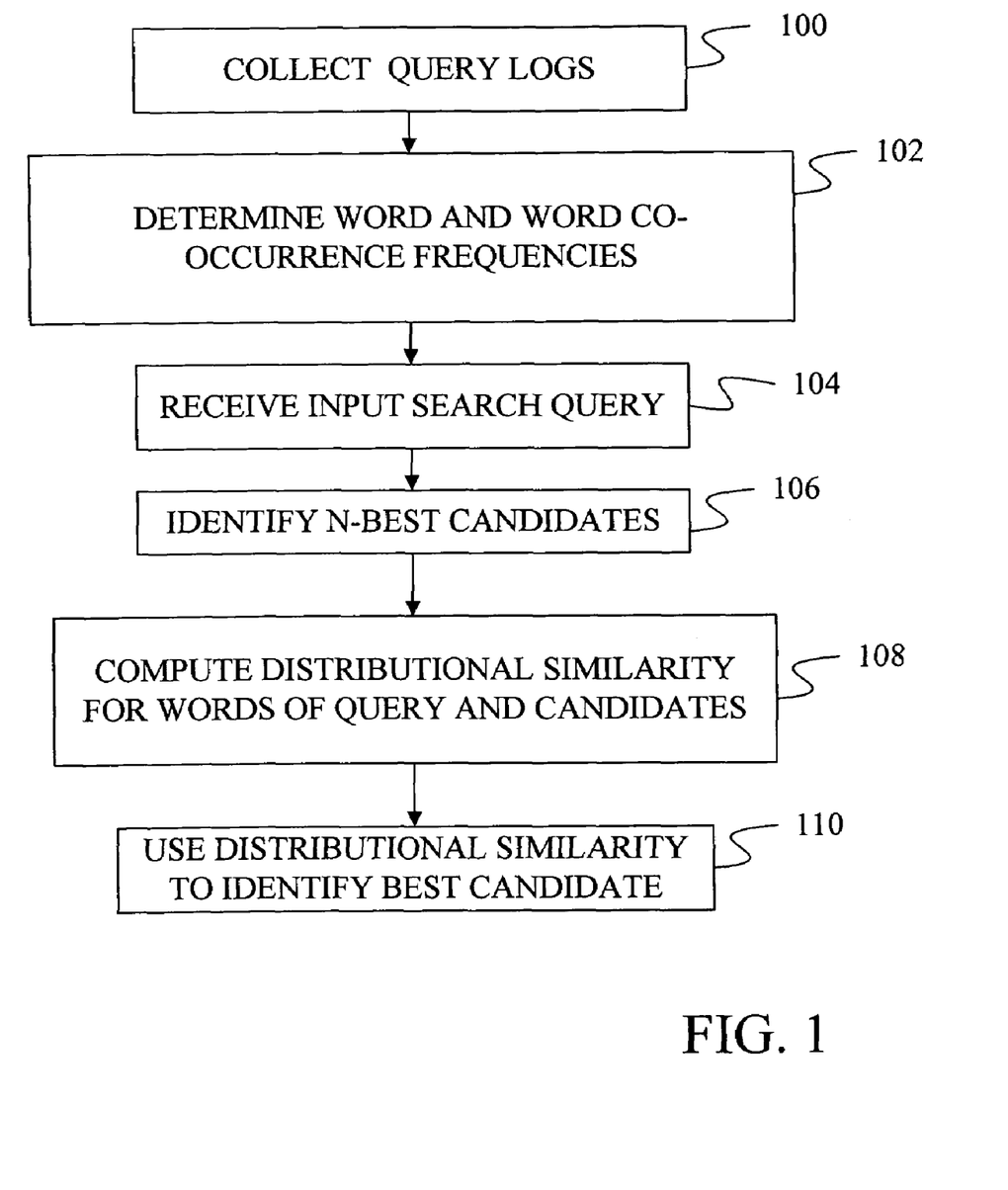
FIG. 1 is a general flow diagram for identifying query corrections.
Figure 2:
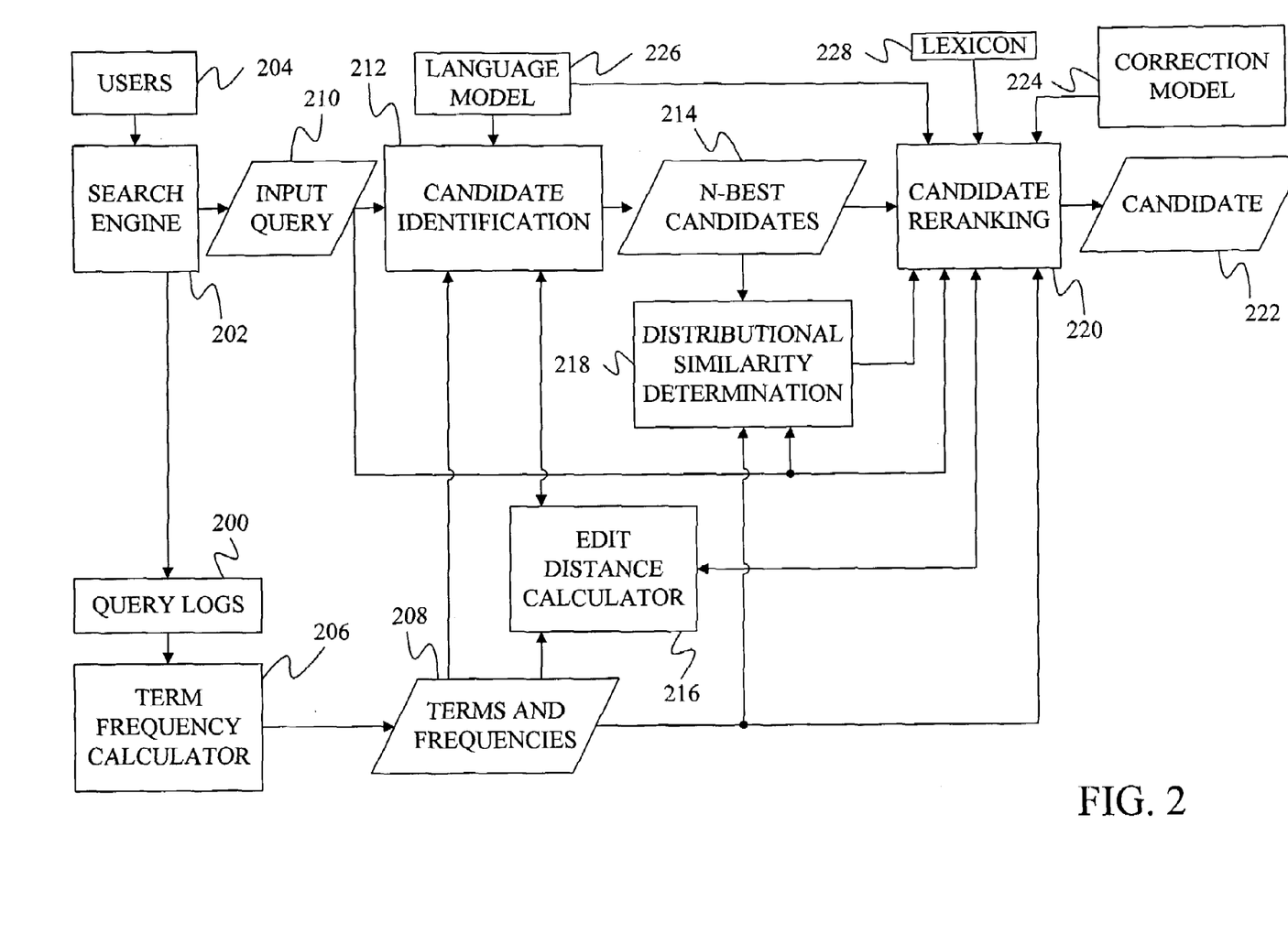
FIG. 2 is a block diagram of elements used in the methods of FIG. 1.

FIG. 1 provides a flow diagram of a general method for identifying a correction candidate from an input query. FIG. 2 provides a block diagram of elements used in the method of FIG. 1.

In step 100, query logs 200 are collected based on searches provided to a search engine 202 by a collection of users 204. Specifically, when a user submits a query to search engine 202, the query is added to query logs 200, if it has not been submitted before, or a count representing the number of times that the query has been submitted is incremented. In some embodiments, query logs 200 are periodically reset so that the latest query logs accurately represent the type of searches that are currently being made.

At step 102, a term frequency calculator 206 parses each query in query logs 200 to identify terms in the queries and the frequencies with which the terms are used in the queries. The frequency of a term is the number of queries that the term has been used in. For example, if the term appears in two queries and one of those queries was submitted five times and the other query was submitted six times, the term frequency would be eleven. Term frequency calculator 206 also determines co-occurrence frequencies. A co-occurrence frequency is the number of times pairs of words appear in the same query. The terms, term frequencies and co-occurrence frequencies are output as terms and frequencies 208.

At step 104, search engine 202 receives an input query 210. Input query 210 is provided to a candidate identification unit 212, which uses the input query to identify N-best correction candidate term sequences 214 at step 106.

Figure 3:
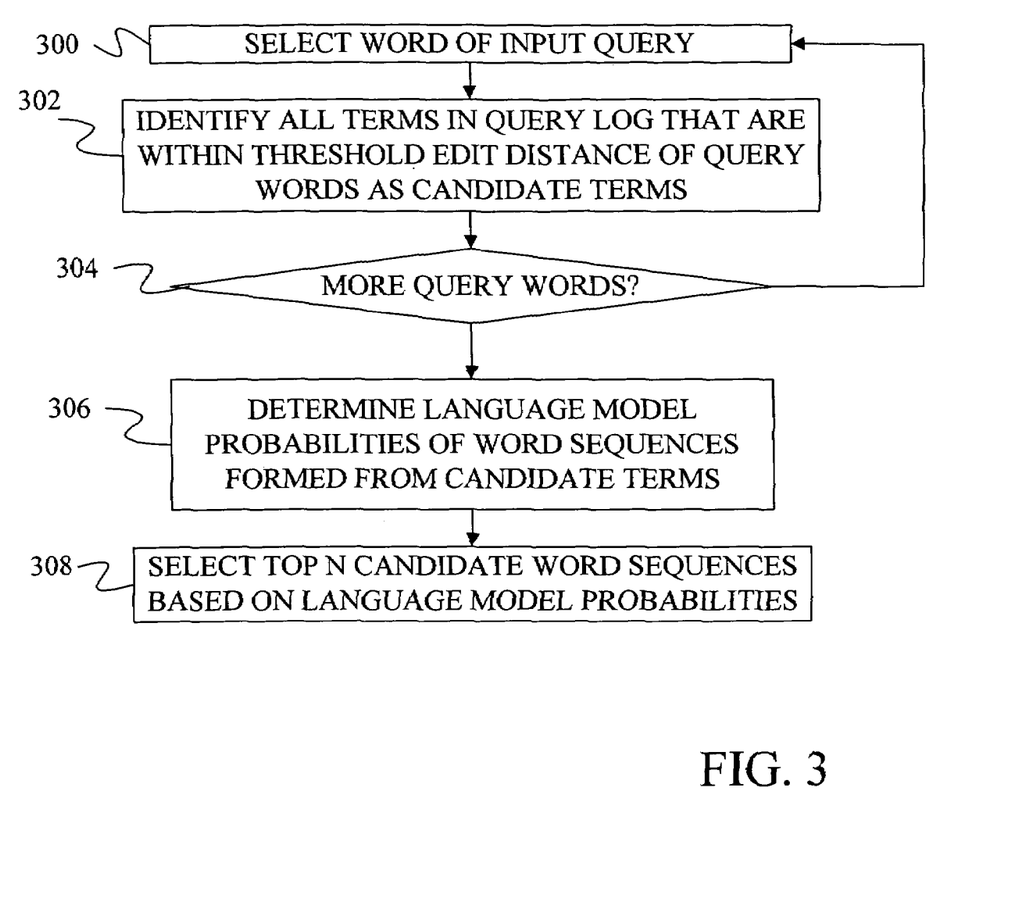
FIG. 3 is a flow diagram of a method for identifying N-best candidates.

FIG. 3 provides a flow diagram of a method of identifying N-best candidates 214. In step 300 of FIG. 3, candidate evaluation 212 selects a term of the input query. At step 302, candidate identification unit 212 accesses terms and frequencies 208 and an edit distance calculator 216 to identify candidate terms in the query log that are within a threshold edit distance of the input query term. A candidate term may be a single word, no word, or multiple words.

Edit distance calculator 216 determines the edit distance between the query term and a candidate term by assigning a distance value to each insertion, deletion, and replacement of individual characters in the input query needed to form the candidate term. Under one embodiment, different distances are associated with different character replacements and different distances may be used for the insertion of characters and the deletion of characters. In some embodiments, the weights applied for replacement of characters are associated with the relative proximity of the two characters on a standard QWERTY keyboard layout. Techniques for computing edit distances are well known in the art.

After candidates that are within a threshold edit distance of the input term have been identified, the process continues at step 304 where candidate identification unit 212 determines if there are more input terms in the query. If there are more input terms in the query, the process returns to step 300 to select the next term of the input query and step 302 is repeated for the new term. When there are no more terms in the input query at step 304, the process continues at step 306 where a language model 226 is used to compute language model probabilities for sequences of candidate terms. Each sequence consists of one candidate term for each query term in the search query in the order set by the search query. Under some embodiments, language model 226 is an n-gram language model, such as a bigram language model.

Under some embodiments, the language model probabilities are determined in an exhaustive fashion by determining a language model probability for each combination of candidate terms. Alternatively, a left-to-right search may be performed in which the language model probabilities are built incrementally starting from the candidates for the first term of the input query and ending at the candidates for the last term in the input query. During this search, sequences of candidate terms that produce low language model probabilities are pruned from further consideration, resulting in a more efficient search.

At step 308, the N candidate word sequences that provide the highest language probability are selected as N-best correction candidates 214 for the input query.

Figure 4:
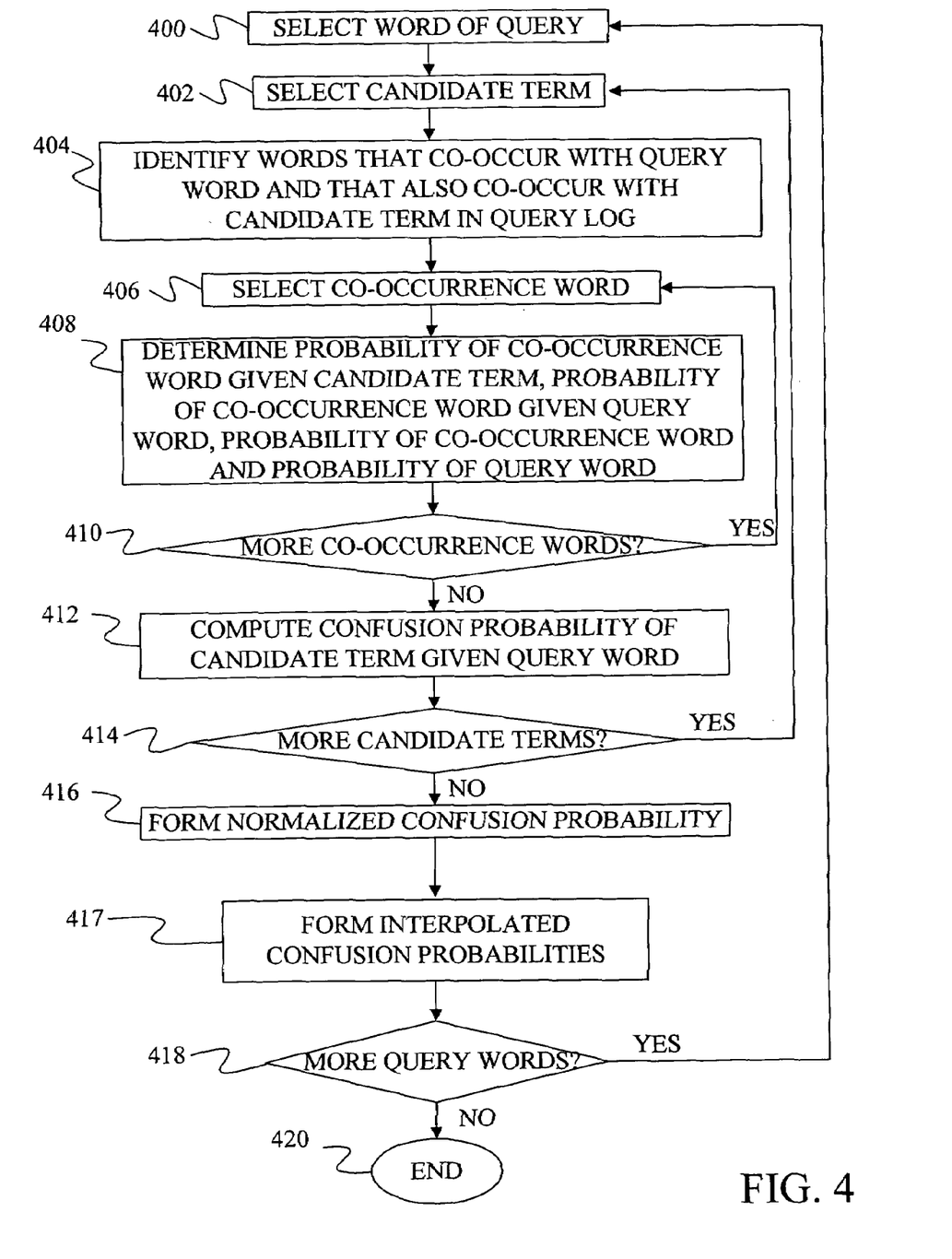
FIG. 4 is a flow diagram for determining distributional similarity using a confusion probability.
Figure 5:
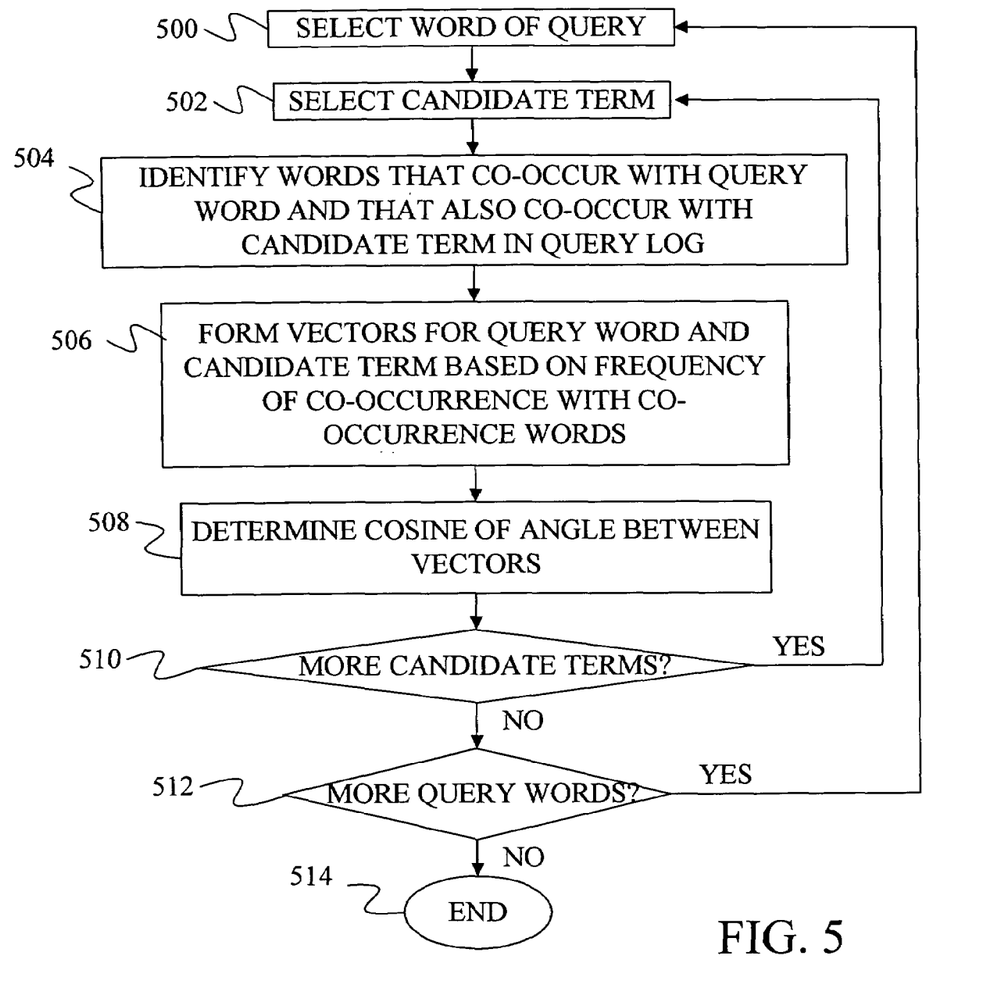
FIG. 5 is a flow diagram for determining distributional similarity using a cosine measure.

Returning to FIG. 1, after identifying N-best candidates 214, a distributional similarity is computed between the terms of each candidate and the respective terms of the input query using distributional similarity determination unit 218 at step 108. Possible distributional similarity metrics include confusion probability, cosine metric and Euclidean distance. FIG. 4 provides a flow diagram for computing distributional similarity using a confusion probability and FIG. 5 provides a flow diagram for computing distributional similarity using the cosine metric.

In step 400 of FIG. 4, the first word of the input query is selected. At step 402, one of the candidate terms from N-best candidates 214 for the selected input word is selected. At step 404, distributional similarity determination unit 214 identifies all words that co-occur with the candidate and also co-occur with the input word using information taken from terms and frequencies 208. At step 406, one of the co-occurrence words is selected and at step 408, a set of probabilities is determined. These probabilities include: the probability of the co-occurrence word given the candidate term; the probability of the co-occurrence word given the input query word; the probability of the co-occurrence word; and the probability of the query word. The probability of the co-occurrence word given the candidate is computed as:

$$p(w_o | w_c) = \frac{f(w_o, w_c)}{\sum_{j=1}^{J} f(w_{o,j}, w_c)} \quad \text{EQ. 1}$$

where $p(w_o|w_c)$ is the probability of co-occurrence word $w_o$ given candidate term $w_c$, $f(w_o,w_c)$ is the frequency of co-occurrence of candidate term $w_c$ with co-occurrence word $w_o$, $f(w_{o,j},w_c)$ as the frequency of co-occurrence of candidate term $w_c$ with co-occurrence word $w_{o,j}$, and J is the number of words that co-occur with both the candidate term and the input word.

The probability of the co-occurrence word given the input word is computed as:

$$p(w_o | w_i) = \frac{f(w_o, w_i)}{\sum_{j=1}^{J} f(w_{o,j}, w_i)} \quad \text{EQ. 2}$$

where $p(w_o|w_i)$ is the probability of co-occurrence word $w_o$ given input query word $w_i$, $f(w_o,w_i)$ is the frequency of co-occurrence of input word $w_i$ with co-occurrence word $w_o$, $f(w_{o,j}, w_i)$ is the frequency of co-occurrence of input word $w_i$ with co-occurrence word $w_{o,j}$, and J is the total number of words that co-occur with both the candidate word and the input word.

The probability of the co-occurrence word is determined as:

$$p(w_o) = \frac{f(w_o)}{\sum_{x=1}^{X} f(w_x)} \quad \text{EQ. 3}$$

where $p(w_o)$ is the probability of the co-occurrence word, $f(w_o)$ is the frequency of word $w_o$, $f(w_x)$ is the frequency of word $w_x$, and X is the total number of words stored in terms and frequencies 208.

Similarly, the probability for the query word is determined as:

$$p(w_i) = \frac{f(w_i)}{\sum_{x=1}^{X} f(w_x)} \quad \text{EQ. 4}$$

where $w_i$ is the query word.

At step 410, the process determines if there are more co-occurrence words that have not been processed. If there are more words, the process returns to step 406 and a new co-occurrence word is selected. The probabilities of step 408 are then computed from the new co-occurrence word. Steps 406, 408 and 410 are repeated until all of the words that co-occur with both the candidate term and the input query word have been processed. At that point, step 412 is performed to compute the confusion probability of the candidate term given the input word. Under one embodiment, this confusion probability is computed as:

$$p(w_i | w_c) = \sum_{j=1}^{J} \frac{p(w_{o,j} | w_c)}{p(w_{o,j})} p(w_{o,j} | w_i) p(w_i) \quad \text{EQ. 5}$$

where $p(w_i|w_c)$ is the confusion probability, $w_{o,j}$ is the $j^{th}$ co-occurrence word and J is the total number of co-occurrence words that appear with both the input query word and the candidate term.

At step 414, the process determines if there are more candidate terms for the input word. If there are more candidate words, the next candidate term is selected at step 402 and steps 404, 406, 408, 410, and 412 are repeated for the new candidate term. When a confusion probability has been determined for each candidate word, the process continues at step 416 where normalized confusion probabilities are determined for each candidate term using:

$$\overline{p}(w_i | w_c) = \frac{p(w_i | w_c)}{\sum_{s=1}^{S} p(w_i | w_{c,s})} \qquad \text{EQ. 6}$$

where $\overline{p}(w_i|w_c)$ is the normalized confusion probability, $p(w_i|w_c)$ is the confusion probability calculated in EQ. 5, $p(w_i|w_{c,s})$ is the confusion probability computed in EQ. 5 for input query word $w_i$ given candidate term $w_{c,s}$ and S is the total number of candidate terms for the input word.

The normalized confusion probability provides a better estimate of the probability since it redistributes the probability mass associated with candidate words that have been pruned during the N-best selection of candidates. Thus, it provides a more accurate probability of the candidate words under consideration.

After the normalized confusion probability has been determined, it may optionally be interpolated with an edit distance probability at step 417 to form an interpolated probability. This step helps to avoid a zero probability problem that can occur with the confusion probability when the query term does not appear in the query logs or there are few context words for the query term in the query logs. The linear interpolation is defined as:

$$p^*(w_i|w_c) = \lambda \overline{p}(w_i|w_c) + (1-\lambda) p_{ed}(w_i|w_c) \qquad \text{EQ. 7}$$

where $p^*(w_i|w_c)$ is the interpolated probability, $\overline{p}(w_i|w_c)$ is the normalized confusion probability, $\lambda$ is a weight and $p_{ed}(w_i|w_c)$ is the edit distance probability of candidate term $w_c$ being misspelled as input word $w_i$, which is calculated as:

$$p_{ed}(w_i | w_c) = \frac{1}{1 + ED} \qquad \text{EQ. 8}$$

where ED is the edit distance between the candidate term and the input word as determined by edit distance calculator 216.

In EQ. 7, $\lambda$ can be optimized experimentally by testing different values of $\lambda$ against a training set and selecting the $\lambda$ value that produces the highest probability for correctly spelled words given an incorrect input.

The interpolated probability of EQ. 7 is formed for each candidate term for the selected input word.

At step 418, the process determines if there are more input words in the input query. If there are more input words, the process returns to step 400 and steps 402 through 416 are repeated for the next input word of the query. When all of the input words have been processed, the method of FIG. 4 ends at step 420.

FIG. 5 provides a flow diagram of a method of computing distributional similarity using a cosine metric. In step 500 of FIG. 5, a word of the input query is selected and at step 502, a candidate term corresponding to the selected input word is selected. At step 504, words that co-occur with both the candidate term and the input word are identified from terms and frequencies 208. In addition, the frequency of co-occurrence between each co-occurrence word and each of the candidate term and the input word is determined from terms and frequencies 208.

At step 506, two vectors are formed, one for the input word and one for the candidate term. The elements of the vectors are the frequency of co-occurrence with the co-occurrence words identified in step 504. For example, for an input word of "blu" and a candidate term "blue", co-occurrence words "ribbon", "sea" and "sky" may be found. The frequency of co-occurrence of these words with the input word may be:
  "blu" and "ribbon": 980
  "blu" and "sea": 810
  "blu" and "sky": 1,558
and the frequency of co-occurrence of these words with the candidate term may be:
  "blue" and "ribbon":95,000
  "blue" and "sea": 83,000
  "blue" and "sky": 150,765

The frequency of co-occurrence for each word forms a separate element of the vector so that the vector for "blu" is [980, 810, 1558] and the vector for "blue" is [95000, 83000, 150765].

At step 508, the cosine of the angle between the two vectors is determined using:

$$\cos \angle v_i, v_c = \frac{\sum_{n=1}^{N} v_{i,n} \cdot v_{c,n}}{\sqrt{\sum_{n=1}^{N} v_{i,n}^2} \sqrt{\sum_{n=1}^{N} v_{c,n}^2}} \qquad \text{EQ. 9}$$

$\cos \angle v_i v_c$ is the cosine of the angel between vector $v_i$ for the input word and vector $v_c$ for the candidate term, $v_{i,n}$ and $v_{c,n}$ are the $n^{th}$ elements of vectors $v_i$ and $v_c$ respectively, and N is the total number of elements in the vectors.

At step 510, the method determines if there are more candidate terms for the current input word. If there are more candidate terms, the process returns to step 502, and steps 504, 506 and 508 are performed to determine a cosine of the angle between the vectors representing a new candidate term and the input word. When all of the candidate terms have been processed at step 510, the method determines if there are more input words at step 512. If there are more input words in the query, the method returns to step 500 to select the next input word in the query and steps 502 through 510 are repeated for the new input word. When all of the input words have been processed, the method ends at step 514.

Figure 6:
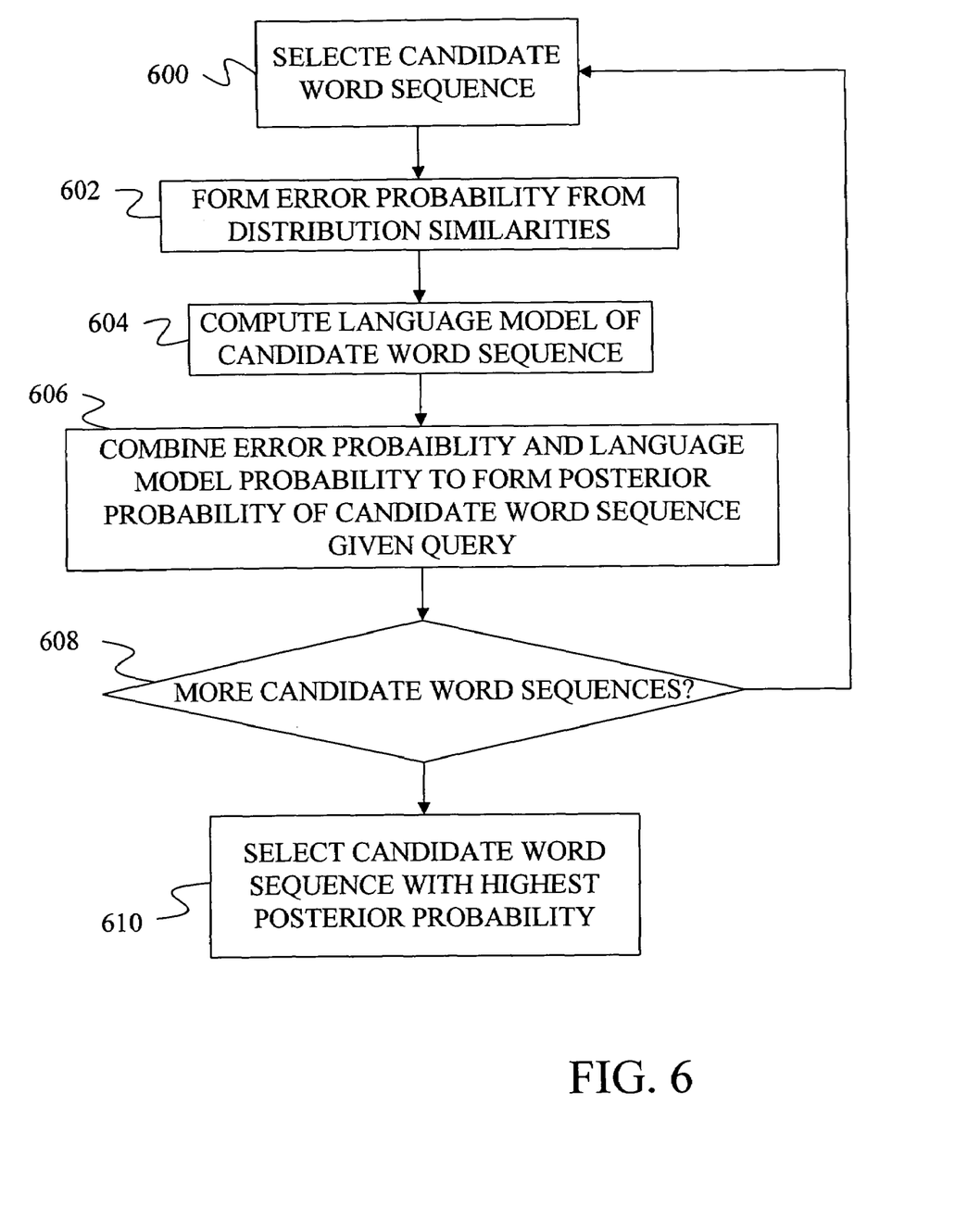
FIG. 6 is a flow diagram for using a distributional similarity to select a candidate based on a source channel model.
Figure 7:
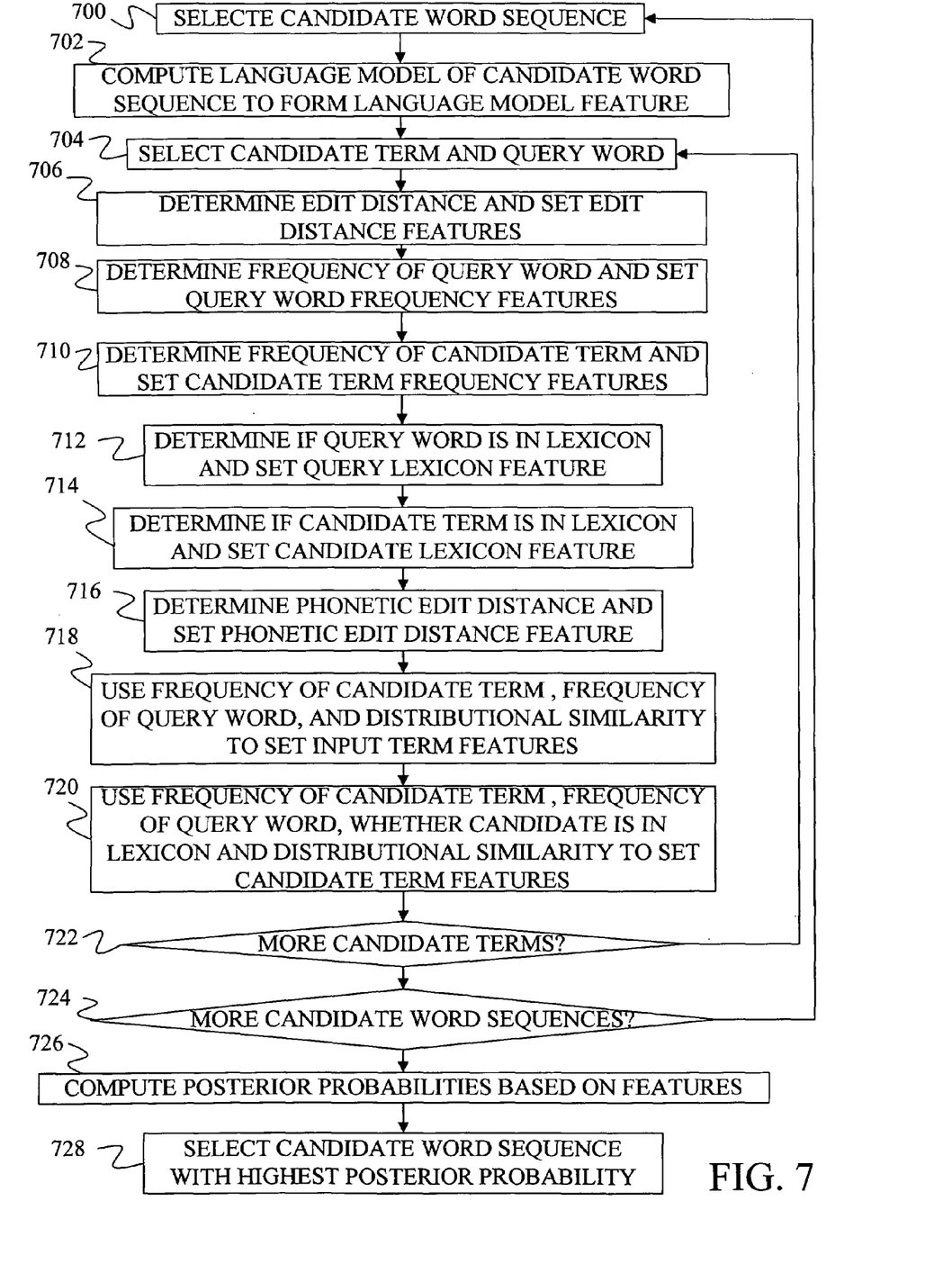
FIG. 7 is a flow diagram for using a distributional similarity to select a candidate based on a maximum entropy model.

Returning to FIG. 1, after the distributional similarities have been computed at step 108, the distributional similarities and a correction model 224 are used by a candidate selection unit 220 of FIG. 2 to identify a best candidate 222 at step 110. FIG. 6 provides a flow diagram of a method of identifying a best candidate 222 using a correction model 224 that is a source channel model. FIG. 7 provides a flow diagram of selecting a best candidate 222 using a correction model 224 that is a maximum entropy model.

In step 600 of FIG. 6, one of the N-best candidate word sequences 214 is selected. At step 602, an error probability is determined from the distributional similarities 218 between the candidate terms of the selected candidate and the input query. For embodiments where the distributional similarity is the interpolated probability of equation 7 above, the error probability is determined as:

$$p(s_i | s_c) = \prod_{k=1}^{K} p^*(w_{i,k} | w_{c,k}) \qquad \text{EQ. 10}$$

where $p(s_i|s_c)$ is the probability of the entire input query $s_i$ given the entire string of terms in the candidate word sequence $s_c$, K is the number of words in the input query, and $p^*(w_{i,k}|w_{c,k})$ is the interpolated probability of the $k^{th}$ word in the input query given the $k^{th}$ term in the candidate sequence of words as computed in EQ. 7 above.

At step 604, a language model probability for the candidate sequence of words is determined using language model 226. Under one embodiment, this language model probability is the product of bigram probabilities computed as:

$$p(s_c) \prod_{k=1}^{K} p(w_{c,k} | w_{c,k-1}) \quad \text{EQ. 11}$$

At step 606, the error probability computed in EQ. 10 is multiplied by the language model probability computed in EQ. 11 to form a posterior probability for the candidate word sequence given the input query as:

$$p(s_c | s_i) = \frac{p(s_i | s_c) p(s_c)}{p(s_i)} \quad \text{EQ. 12}$$

At step 608, the process determines if there are more candidate word sequences. If there are more candidates, the process returns to step 600 and selects a new candidate word sequence. Steps 602, 604, and 606 are then repeated for the new candidate word sequence. When all of the candidates have been processed at step 608, the method continues at step 610, where the candidate word sequence with the highest probability as computed using EQ. 12 above is selected as the correction candidate 222 of FIG. 2.

FIG. 7 provides a flow diagram for selecting a candidate 222 using a maximum entropy model as correction model 224. This model generates a posterior probability of a candidate word sequence given an input query as:

$$p(s_c | s_i) = \frac{\exp \sum_{k=1}^{K} \sum_{n=1}^{N} \lambda_n f_n(w_{c,k}, w_{i,k})}{\sum_{c=1}^{C} \exp \sum_{k=1}^{K} \sum_{n=1}^{N} \lambda_n f_n(w_{c,k}, w_{i,k})} \quad \text{EQ. 13}$$

where $p(s_c|s_i)$ is the posterior probability of candidate word sequence $s_c$ given input query $s_i$, $f_n(w_{c,k},w_{i,k})$ is a feature that is formed based on the $k^{th}$ candidate term and the $k^{th}$ input query word, N is the total number of features, K is the total number of input query words, C is the total number of candidate word sequences and $\lambda_n$ is a feature weight. The feature weights can be optimized by maximizing the posterior probability on a training set by selecting the $\lambda$ that maximize the log probability of the correct query given the incorrect query across the entire training set. Under one embodiment, generalized iterative scaling is used to learn the feature weights.

Under one embodiment, the features include:
- a language model feature based on the logarithm language model probability of the candidate word sequence;
- edit distance features, based on the edit distance between candidate terms and input query terms;
- input frequency features, based on the frequency of input query terms in the query logs;
- candidate frequency features, based on the frequency of candidate terms in the query logs;
- input lexicon features, based on whether input query terms appear in a lexicon;
- candidate lexicon features, based on whether candidate terms appear in the lexicon;
- phonetic features, based on the distance between the phonetic description of a query term and the phonetic description of a candidate term;
- distributional similarity based input term features, based on a combination of distributional similarity and the frequencies of candidate terms and query terms;
- distributional similarity based correction candidate features, based on a combination of distributional similarity, the frequencies of candidate terms and query terms, and whether a candidate term is in a lexicon.

At step 700 of FIG. 7, a candidate word sequence from the N-best candidates 214 is selected. At step 702, the language model probability of the candidate is determined using language model 226. In many embodiments, this involves using a bigram language model probability as shown in EQ. 11 above. This language model probability forms the language model feature.

At step 704, one of the candidate words in the selected candidate sequence is selected along with its corresponding word from the input query. At step 706, edit distance calculator 216 is used to determine the edit distance between the selected candidate word and the selected input query word. This edit distance is compared against a threshold. If it exceeds the threshold, an edit distance binary feature is set to 1. If it does not exceed the threshold, the edit distance binary feature is set to 0.

At step 708, the frequency of the input term is retrieved from terms and frequencies 208 and is compared to a plurality of thresholds. Each threshold is associated with a separate binary input frequency feature that can have values of 1 or 0. If the frequency is greater than the associated threshold, the feature has a value of 1, and if the frequency does not exceed the threshold, the feature has a value of 0. Under one embodiment, 5 features are set with 5 respective thresholds beginning at frequencies of 10,000 and incrementing by 10,000 to a final frequency of 50,000.

At step 710, the frequency of the candidate word is retrieved from terms and frequencies 208 and is compared to a set of threshold frequencies. Each threshold is associated with a separate binary candidate frequency feature that can have values of 1 or 0. If the frequency of the candidate word exceeds the threshold associated with the feature, the feature is set to 1. If it does not exceed the threshold for the feature, the feature is set to 0. Under one embodiment, 5 thresholds are provided beginning with a frequency of 10,000 and ending at a frequency of 50,000, with intervals of 10,000.

At step 712, candidate selection unit 220 determines if the query term is present in a lexicon 228. If the query term is present in a lexicon, then a binary input lexicon feature is set to 1. If the input term is not in the lexicon, the input lexicon feature is set to 0.

At step 714, candidate selection unit 220 determines if the candidate term is in lexicon 228. If the candidate term is in the lexicon, a binary candidate lexicon feature is set to 1. If the candidate term is not in the lexicon, the candidate lexicon feature is set to 0.

At step 716, phonetic descriptions of the candidate term and input word are determined. These can be determined using a text-to-phoneme converter (not shown) or by retrieving the phonetic description from lexicon 228. The phonetic description of the candidate and input word are compared and the edit distance between their phonetic descriptions is determined. This edit distance represents the difference in the phonetic descriptions between the candidate word and the input word. The phonetic edit distance is then compared to a threshold and a binary phonetic feature is set based on whether the edit distance exceeds the threshold. In particular, the phonetic feature is set to 0 if the phonetic edit distance does not exceed the threshold, and is set to 1 if the phonetic edit distance does exceed the threshold.

At step 718 the frequency of the candidate term, the frequency of the input word and the distributional similarity between the candidate term and the input word are used to set a plurality of distributional similarity based input term features. In particular, thresholds are set both for the frequency of the input term and the distributional similarity. Under one particular embodiment, the frequency thresholds are enumerated from 10,000 to 50,000 with intervals of 5,000. The distributional similarity thresholds are numerated from 0.6 to 1 with intervals of 0.1. For each combination of frequency threshold and distributional similarity threshold a separate input term feature is defined. An input term feature will be set to 1 when the frequency of the query term exceeds the threshold associated with the input term feature and the distributional similarity between the candidate word and the input word exceeds the distributional similarity threshold associated with the input term feature. In addition, in order for an input term feature to be set to 1, the candidate term for the input term cannot have a frequency that exceeds the frequency of the input term.

At step 720, candidate selection 220 utilizes terms and frequencies 208, lexicon 238 and distributional similarities provided by distributional similarity determination unit 218 to set a collection of distributional similarity based correction candidate features. Each correction candidate feature is associated with a separate distributional similarity threshold. Under one embodiment, the distributional similarity thresholds are numerated from 0.6 to 1 with an interval of 0.1. Thus, there are 5 different thresholds and 5 different correction candidate features. A correction candidate feature will be set to 1 when the distributional similarity between the candidate and the input term is higher than the threshold associated with the feature and at the same time the candidate term's frequency is higher than the query term or the candidate term is in lexicon 228.

At step 722, candidate selection 220 determines if there are more candidate terms in the selected candidate word sequence. If there are more candidate terms, the process returns to step 704 and steps 704 through 720 are repeated for the new candidate terms. When all of the candidate terms have been processed at step 722, the method determines if there are more candidate sequences of words at step 724. If there are more candidate sequences of words, the next candidate sequence is selected by returning to step 700 and step 702 through 722 are repeated for the new candidate sequence of words.

When all of the candidate sequences of words have been processed, candidate selection unit 220 computes the posterior probability for each candidate word sequence using equation 13 above. At step 728, the candidate word sequence that has the highest posterior probability is selected as correction candidate 222 and the process of FIG. 7 ends.

Figure 8:
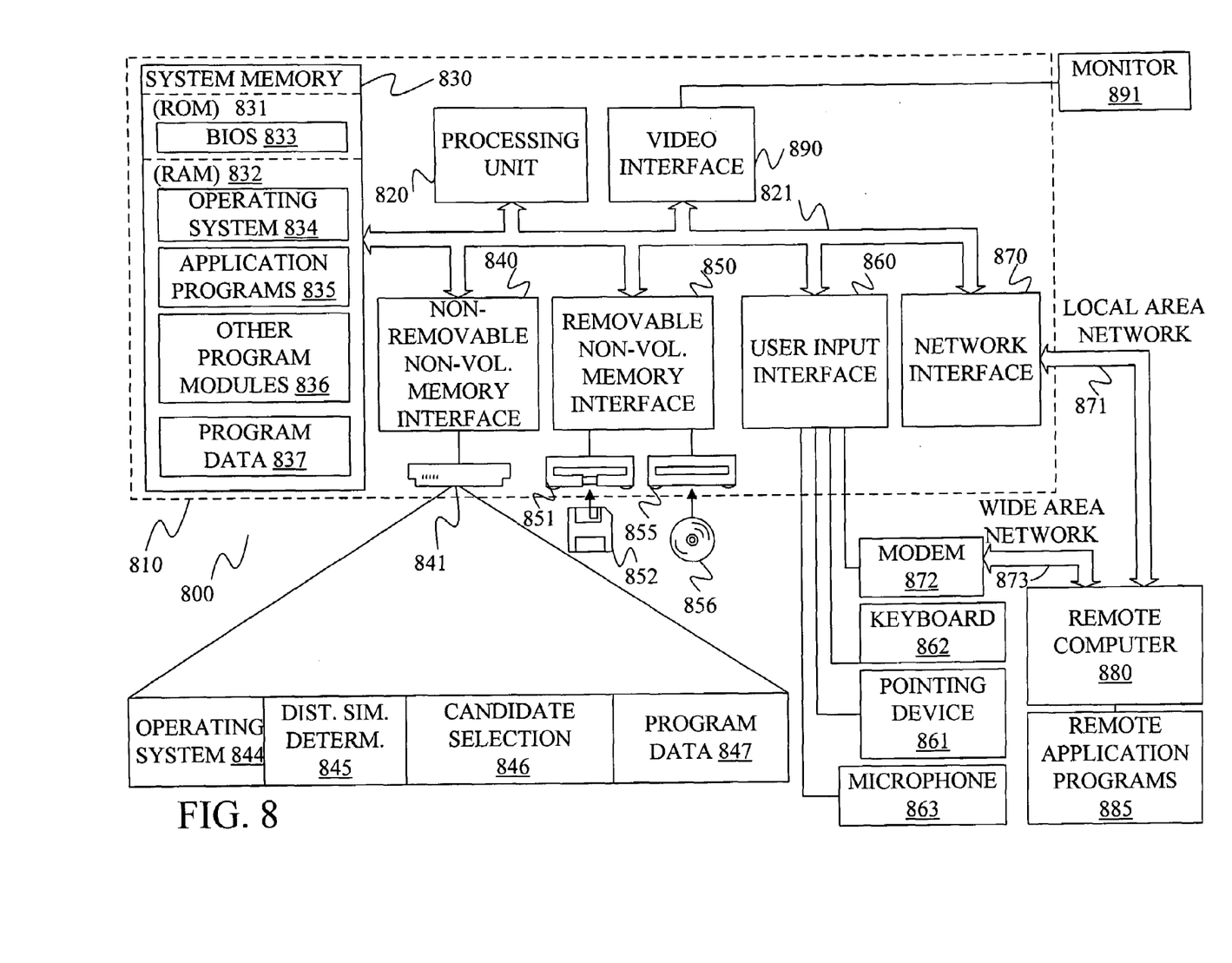
FIG. 8 is a block diagram of a computing environment.

FIG. 8 illustrates an example of a suitable computing system environment 800 on which embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 1 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, distributional similarity determination 218, candidate selection 220, and program data 847.

A user may enter commands and information into the computer 810 through input devices such as a keyboard 862, a microphone 863, and a pointing device 861, such as a mouse, trackball or touch pad. These and other input devices are often connected to the processing unit 820 through a user input interface 860 that is coupled to the system bus. A monitor 891 or other type of display device is also connected to the system bus 821 via an interface, such as a video interface 890.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving an input search query;
identifying a set of candidate word sequences;
a processor determining a distributional similarity between a word of the input search query and a term of one of the candidate word sequences using a query log of logged search queries by:
  identifying a set of all co-occurrence words that co-occur with the word of the input search query in at least one logged search query in the query log and that also co-occur with the term of one of the candidate word sequences in at least one logged search query in the query log;
  for each co-occurrence word in the set of identified co-occurrence words:
    determining the number of logged search queries in which the co-occurrence word and the word of the input search query appeared together in the query log to form a first co-occurrence frequency; and
    determining the number of logged search queries in which the co-occurrence word and the term of the candidate word sequence appeared together in the query log to form a second co-occurrence frequency;
  using the first and second co-occurrence frequencies for each co-occurrence word in the set of all co-occurrence words to determine the distributional similarity using a metric from a set of metrics consisting of a confusion probability metric and a cosine metric, wherein the confusion probability metric is calculated by taking a sum over all co-occurrence words in the set of all co-occurrence words where each summand in the sum is computed based at least on a product of a probability of the word of the input search query given the co-occurrence word and a probability of the term of the candidate word sequence given the co-occurrence word and wherein the cosine metric is calculated by determining the cosine of an angle between a first vector for the word of the input search query and a second vector for the term of the candidate word sequence;
using the distributional similarity to determine an error model probability that describes the probability of the input search query given the candidate word sequence associated with the distributional similarity;
using the error model probability to determine a probability of the candidate word sequence associated with the distributional similarity given the input search query; and
using the probability of the candidate word sequence associated with the distributional similarity given the input search query to select a candidate word sequence as a corrected word sequence for the search query.

2. The method of claim 1 wherein determining a confusion probability comprises:
for each co-occurrence word:
  determining the probability of the co-occurrence word given the term of the candidate word sequence;

determining the probability of the co-occurrence word given the word of the input search query;

determining the probability of the co-occurrence word;

determining the probability of the word of the input search query; and multiplying the probability of the co-occurrence word given the word of the candidate word sequence by the probability of the co-occurrence word given the word of the input search query and by the probability of the word of the input search query, and dividing the product by the probability of the co-occurrence word to form the summand for the co-occurrence word.

3. The method of claim 2 wherein determining the confusion probability comprises determining a normalized confusion probability through steps comprising:

for each of a set of candidate words, determining a separate confusion probability;

forming a sum of the separate confusion probabilities; and dividing the confusion probability by the sum of confusion probabilities to form the normalized confusion probability.

4. The method of claim 3 wherein determining a confusion probability further comprises determining an interpolated probability through steps comprising:

applying a weight to the normalized confusion probability to form a weighted confusion probability;

determining a value based on an edit distance between the word of the input search query and the term of the candidate word sequence;

applying a weight to the value to form a weighted value; and adding the weighted confusion probability to the weighted value to form the interpolated probability.

5. The method of claim 1 wherein using the distributional similarity to determine an error model probability that describes the probability of the search query given the candidate word sequence associated with the distributional similarity comprises:

determining a confusion probability for each word in the candidate word sequence; and multiplying the confusion probabilities by each other to form the error model probability.

6. The method of 1 wherein using the error model probability to determine a probability of the candidate word sequence associated with the distributional similarity given the input search query comprises:

determining a language model probability for the candidate word sequence; and combining the language model probability and the error model probability to form the probability of the candidate word sequence associated with the distributional similarity given the input search query.

7. The method of claim 1 wherein identifying a set of candidate word sequences comprises:

identifying a set of candidate words for each word of the input search query that are within a threshold edit distance of the word of the input search query;

computing a language model probability for sequences of the candidate words; and selecting a set of the sequences of candidate words based on the language model probabilities.

8. A computer-readable storage medium having stored thereon computer-executable components that cause a processor to perform steps comprising:

receiving an input search query;

identifying a candidate word sequence from a query log comprising a plurality of logged search queries;

determining a distributional similarity between a word of the input search query and a term of the candidate word sequence by:

identifying a set of all co-occurrence words that co-occur with the word of the input search query in at least one logged search query in the query log and that also co-occur with the term of the candidate word sequence in at least one logged search query in the query log;

for each co-occurrence word in the set of identified co-occurrence words:

determining the number of logged search queries in which the co-occurrence word and the word of the input search query appeared together in the query log to form a first co-occurrence frequency; and determining the number of logged search queries in which the co-occurrence word and the term of the candidate word sequence appeared together in the query log to form a second co-occurrence frequency;

using the first and second co-occurrence frequencies for each co-occurrence word in the set of all co-occurrence words to determine the distributional similarity using a metric from a set of metrics consisting of a confusion probability metric and a cosine metric, wherein the confusion probability metric is calculated by taking a sum over all co-occurrence words in the set of all co-occurrence words where each summand in the sum is computed based at least on a product of a probability of the word of the input search query given the co-occurrence word and a probability of the term of the candidate word sequence given the co-occurrence word and wherein the cosine metric is calculated by determining the cosine of an angle between a first vector for the word of the input search query and a second vector for the term of the candidate word sequence;

using the distributional similarity to determine an error model probability that describes the probability of the input search query given the candidate word sequence associated with the distributional similarity;

using the error model probability to determine a probability of the candidate word sequence associated with the distributional similarity given the input search query; and using the probability of the candidate word sequence associated with the distributional similarity given the input search query to select a candidate word sequence as a corrected word sequence for the search query.

9. The computer-readable storage medium of claim 8 wherein identifying a candidate word sequence from a query log comprises:

identifying a set of candidate word sequences based on edit distances between words in the candidate word sequences and words in the input search query;

determining a language model probability for at least one candidate word sequence;

using the language model probability to identify a sub-set of the set of candidate word sequences.

* * * * *